United States Patent
Pearlstein et al.

(10) Patent No.: US 6,277,342 B1
(45) Date of Patent: Aug. 21, 2001

(54) STORAGE AND SAFE DELIVERY OF HAZARDOUS SPECIALTY GASES BY ACID/BASE REACTIONS WITH IONIC POLYMERS

(75) Inventors: Ronald Martin Pearlstein, Macungie; Steven Arthur Rogers, Blandon, both of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/379,007

(22) Filed: Aug. 23, 1999

(51) Int. Cl.$^7$ .................................................. F17C 5/00
(52) U.S. Cl. ................... 423/210; 423/230; 423/240 S; 95/116; 95/148; 95/131; 95/133; 95/136; 206/0.6; 206/0.7
(58) Field of Search ................ 206/0.6, 0.7; 95/95, 95/96, 116, 148, 131, 133, 136; 423/210, 230, 240 S

(56) References Cited

U.S. PATENT DOCUMENTS

| | | | |
|---|---|---|---|
| 4,178,224 | 12/1979 | Porter | 204/237 |
| 5,037,624 | 8/1991 | Tom et al. | 423/210 |
| 5,158,656 | 10/1992 | Ayers | 204/101 |
| 5,425,857 | 6/1995 | Bouchard et al. | 204/101 |
| 5,458,674 | * 10/1995 | Barsotti | 95/122 |
| 5,474,659 | 12/1995 | Cadet et al. | 204/101 |
| 5,518,528 | 5/1996 | Tom et al. | 95/103 |
| 5,707,424 | * 1/1998 | Tom et al. | 95/95 |
| 5,761,910 | * 6/1998 | Tom | 62/46.1 |
| 5,916,245 | * 6/1999 | Tom | 62/46.1 |
| 5,935,305 | * 8/1999 | Tom et al. | 96/143 |
| 5,993,766 | * 11/1999 | Tom et al. | 423/294 |
| 6,019,823 | * 2/2000 | Tischler et al. | 96/108 |
| 6,132,492 | * 10/2000 | Hultquist et al. | 95/45 |
| 6,177,058 | * 1/2001 | Singh et al. | 423/483 |

OTHER PUBLICATIONS

Portfield, "Inorganic Chemistry" at p. 252, Table 5.6 (Addison–Wesley Publ. 1984). ISBN 0–201–05660–7.
(Olah et al., "Perfluorinated Resinosulfonic Acid (Nalon–H®) Catalysis in Synthesis," 7 *Synthesis* 513 (1986) Jul.
Stull, "Vapor Pressure of Pure Substances Organic Compounds," 39 *Ind. Eng. Chem.* 517–540 Apr. (1947). vol. 39 No. 4.
Brown et al., "Boiling Point Data" in Nist Standard Reference Database No. 69, Eds. Mallard et al., Feb. 1997, National Institute of Standards and Technology, Gaithersburg MD, 20899).

* cited by examiner

*Primary Examiner*—Steven P. Griffin
*Assistant Examiner*—Timothy C. Vanoy
(74) *Attorney, Agent, or Firm*—Geoffrey L. Chase

(57) ABSTRACT

A method for delivering a gas having a proton affinity of less than 866 kJ/mol is disclosed. A support including at least one polymer sufficiently acidic to protonate the gas is contacted with the gas to protonate the gas. The protonated gas condenses to form a solid salt which is sorbed by the support. The gas is dispensed by deprotonating the sorbed solid salt to regenerate said gas. The at least one polymer of the support has a first Hammett acidity value greater than a second Hammett acidity value of a conjugate acid of the gas. Also provided is an apparatus for performing the method. The invention is especially useful for storing, transporting and delivering hazardous gases, such as arsine and phosphine. The polymer can be polymeric sulfonic acids, polymeric perfluoroalkylsulfonic acids, fluorinated sulfonic acid polymers, cross-linked sulfonated polystyrene-divinylbenzene macroreticular copolymers, carboxylic acid polymers, halogenated carboxylic acid functionalized polymers and mixtures thereof.

21 Claims, No Drawings

STORAGE AND SAFE DELIVERY OF HAZARDOUS SPECIALTY GASES BY ACID/BASE REACTIONS WITH IONIC POLYMERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates generally to storage and dispensing systems for the selective dispensing of gaseous compounds, in particular hazardous hydride and halide gases, from a storage container in which the gaseous compounds are held in sorptive relationship to a solid sorbent medium, and are desorptively released from the sorbent medium in the dispensing operation.

The semiconductor manufacturing industry uses a number of hazardous specialty gases for doping, etching and thin-film deposition. For example, phosphine ($PH_3$) and arsine ($AsH_3$) are needed for numerous semiconductor fabrication processes, though their use poses significant safety and environmental challenges due to their high toxicity and pyrophoricity (i.e., spontaneous inflammability in air). The storage and transport of highly toxic or pyrophoric materials as compressed or liquefied gases in metal cylinders is often unacceptable because of the possibility of developing a leak or catastrophic rupture of the container which could lead to injuries or death. It would be preferable to have a reliable source of these gases wherein the gases are maintained at or below atmospheric pressure during shipping and storage. Also, since many semiconductor processes using specialty gases are operated below ambient pressure, positive gauge pressures of these gases may not be needed, even when in use.

In order to mitigate some of these safety issues, on-site electrochemical generation of such gases has been described. See, e.g., U.S. Pat. Nos. 4,178,224, 5,158,656, 5,425,857 and 5,474,659. Because of difficulties in the on-site synthesis of these gases, a better technique has been developed where the gas is physisorbed or chemisorbed on a support, thereby reducing the vapor pressure of the gas to render it safer. For example, U.S. Pat. No. 5,518,528 to Tom et al. discloses such a process wherein $PH_3$ and $AsH_3$ are adsorbed on physical sorbent and chemisorbent materials, such as strongly basic adsorbents dispersed in, but not covalently bonded to a support. The strong bases presumably react at the surface with the weakly acidic protons on the hydride gas molecules.

It would be more desirable to have a system where the hazardous specialty gas could be reversibly immobilized by undergoing a chemical reaction with the bulk of the solid sorbent. This approach has the potential for higher sorption capacities compared to the surface adsorption and chemisorption approaches of the prior art. The ability to tune the chemical reactivity of the sorbent also provides far greater control over the equilibrium pressure of the hazardous gas over the solid.

All references cited herein are incorporated herein by reference in their entireties.

BRIEF SUMMARY OF THE INVENTION

The invention addresses at least the aforementioned problems by providing a method for delivering a basic gas, said method comprising:

providing a support comprising at least one polymer sufficiently acidic to protonate said basic gas;

contacting said support with said basic gas, whereby said basic gas is protonated by said at least one polymer and condensed to form a solid salt sorbed by said support; and deprotonating said sorbed solid salt to regenerate said basic gas, whereby said delivery of said regenerated basic gas is effected, wherein said basic gas has a proton affinity of less than 866 kJ/mol, and said at least one polymer has a first Hammett acidity value more negative than a second Hammett acidity value of a conjugate acid of said basic gas.

Preferably, the proton affinity of said basic gas is about 607 kJ/mol to about 837 kJ/mol, more preferably from 628 kJ/mol to 795 kJ/mol.

In certain embodiments, the basic gas is a hydride or halide, and/or is selected from the group consisting of silane, germane, phosphine, trifluorophosphine, arsine, stibine, hydrogen sulfide, hydrogen selenide and hydrogen telluride. Preferably, the basic gas is phosphine or arsine.

Preferably, the first Hammett acidity value is from −17 to 6.5, more preferably from −14 to 2, even more preferably from −12.5 to −7. In certain embodiments, the first Hammett acidity value is −12 or more negative than −12.

In certain embodiments, the at least one polymer is selected from the group consisting of polymeric sulfonic acids, polymeric perfluoroalkylsulfonic acids, fluorinated sulfonic acid polymers, cross-linked sulfonated polystyrene-divinylbenzene macroreticular copolymers, carboxylic acid polymers halogenated carboxylic acid functionalized polymers and mixtures thereof.

In certain embodiments, the at least one polymer is selected from the group consisting of polymeric sulfonic acids, polymeric perfluoroalkylsulfonic acids, fluorinated sulfonic acid polymers and mixtures thereof.

In certain embodiments, the at least one polymer is a perfluorinated sulfonic acid represented by the following Formula I:

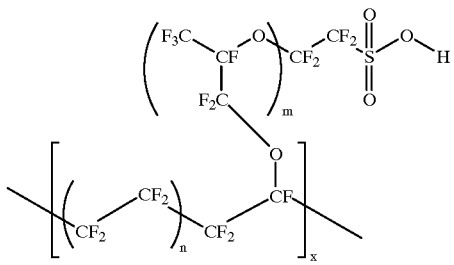

where m is from 0 to 2, preferably from 0 to 1, n is from 0.0 to 4.0, preferably from 0.0 to 2.0, and x is from 10 to 10,000, preferably from 500 to 5,000.

In certain embodiments, the at least one polymer is a fluorinated sulfonic acid represented by the following Formula II:

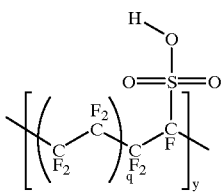

where q is from 0.0 to 9.0, preferably from 0.0 to 1.0 and y is from 10 to 10,000, preferably from 500 to 5,000.

In certain embodiments, the at least one polymer is a cross-linked sulfonated polystyrene-divinylbenzene macroreticular copolymer represented by the following Formula III:

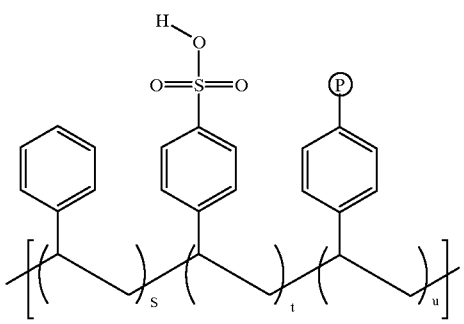

where s is from 0.0 to 0.75, preferably from 0.0 to 0.50, more preferably from 0.0 to 0.1, t is from 0.25 to 1.0, preferably from 0.5 to 0.95, more preferably from 0.8 to 0.93, and u is from 0.0 to 0.25, preferably from 0.01 to 0.16, more preferably from 0.07 to 0.09.

In certain embodiments, the solid salt is heated to effect said deprotonating.

In certain embodiments, the solid salt is contacted with a competitive base compound to effect said deprotonating, said competitive base compound having a proton affinity greater than that of said basic gas. In some of these embodiments, the competitive base compound has a proton affinity of at least 866 kJ/mol, and/or is ammonia.

The invention also provides an apparatus adapted to deliver a basic gas according to the aforementioned method, said apparatus comprising:

a container containing said support and adapted to selectively contain said basic gas; and a valve in fluid communication with said container, and adapted to selectively convey said basic gas into and out of said storage and dispensing vessel.

BRIEF DESCRIPTION OF SEVERAL VIEWS OF THE DRAWINGS

Not applicable.

DETAILED DESCRIPTION OF THE INVENTION

The invention enables safe storage, transportation and delivery of a gas by sorbing the gas with a sorbent composition sufficiently acidic to protonate the gas. Upon protonation, the gas and sorbent collectively form a solid salt which is more easily handled than the gas, and can be converted back to the gas by deprotonation.

The invention can be used to store, transport and deliver any weakly basic gas, although the invention is particularly suitable for use with weakly basic hazardous gases for at least the reasons set forth above. As used herein, the expression "weakly basic" means that the substance being described is less basic than ammonia. Thus, weakly basic gases according to the invention have a gas phase proton affinity of less than 207 kcal/mol (866 kJ/mol), preferably from about 145 kcal/mol (607 kJ/mol) to about 200 kcal/mol (837 kJ/mol), and more preferably from 150 kcal/mol (628 kJ/mol) to 190 kcal/mol (795 kJ/mol). Proton affinities of a variety of compounds are tabulated in Porterfield, "Inorganic Chemistry" at p. 252, Table 5.6 (Addison-Wesley Publ. 1984). Particularly suitable gases for use in the invention include, e.g., hydride gases and halide gases, such as silane, germane, phosphine, trifluorophosphine, arsine, stibine, hydrogen sulfide, hydrogen selenide and hydrogen telluride.

The invention is particularly advantageous for storing, transporting and delivering the gaseous hydrides $PH_3$ and $AsH_3$, which are commonly used as sources of arsenic and phosphorus in ion implantation. Due to their extreme toxicity and high vapor pressure, the use, transportation and storage of $PH_3$ and $AsH_3$ raise significant safety concerns for the semiconductor industry.

Compounds such as $AsH_3$ and $PH_3$ can act both as weak acids and weak bases. The acidic properties of $AsH_3$ and $PH_3$ are exploited by U.S. Pat. No. 5,037,624 in which a solid, basic substrate is described that irreversibly chemisorbs those compounds in order to abate them from a gas exhaust stream. On the other hand, the invention described herein utilizes the weak gas phase basicity of compounds such as $AsH_3$ and $PH_3$, to reversibly bind, and hence temporarily store, these species on solid, acidic substrates. That $AsH_3$ and $PH_3$ are weak bases is evidenced by their respective proton affinities of 175 kcal/mol (732 kJ/mol) and 185 kcal/mol (774 kJ/mol). Although not applicable to anhydrous systems, $PH_3$ has a $pK_b$ value of −27 and a $pK_a$ value of −29 in water. The weak basicity of $PH_3$ is evident in its reaction with anhydrous HCl ($pK_a$=−5.7) to form a phosphonium salt, $[PH_4]^+Cl^-$. $AsH_3$ can also be protonated by the strong acids HI ($pK_a$=−10.7) and HBr ($pK_a$=−7.7), but not by the slightly weaker acids, HCl and HF ($pK_a$=+3.5). Note that despite its high $pK_a$, anhydrous HF has the relatively large Hammett acidity factor ($H_0$) of −10.2, indicative of substantial acidity in non-aqueous systems.

The protonated pnictide onium ions (i.e., $AsH_4^+$ and $PH_4^+$) formed by protonation of arsine and phosphine are a potential source of the corresponding hydride gases. For example, $PH_3$ is liberated upon the action of heat or aqueous NaOH on $PH_4I$ By choosing an appropriate acid sorbent composition which permits adequate diffusion of the hydride gas to its acid functionalities, a reversible reaction to form solid onium salts can be effected. The acidity of the sorbent composition and its acid functionalities are chosen so that the reverse reaction which leads to liberation of the hydride gas can occur in response to a predetermined stimulus, such as raising the temperature to a predetermined value or contacting the salt with a base (e.g., ammonia) stronger than the original hydride gas.

Onium complexes can be prepared by directly contacting the phosphine, arsine or similar gas with an ionic polymer in its $H^+$ form. Preferably, the polymer is initially dried to the point that the vapor pressure of water in equilibrium with the polymer is low, most preferably less than 1 ppm, at 1 atmosphere total pressure. It is important, however, that the drying process not totally destroy the porosity of the polymer to gaseous species. A macroreticular or heavily cross-linked polymer may be used so as to retain a greater degree of porosity when dried sufficiently. Other means of preparation of these ion-exchanged polymers may be envisioned, though the direct combination of the strongly acidic polymer with the weakly basic gas is preferred for its simplicity.

Compounds suitable for use in sorbent compositions according to the invention include solids sufficiently acidic to protonate the weakly basic gas being sorbed. Thus, compounds having a Hammett acidity parameter more negative than the Hammett acidity parameter of the conjugate acid of the weakly basic gas are preferred. $H_0$ is generally from −17 to 6.5, preferably from −14 to 2, more preferably from −12.5 to −7. Particularly preferred as constituents of suitable sorbent compositions are ionomers, such as, e.g., polymeric sulfonic acids and polymeric perfluoroalkylsulfonic acids, and mixtures thereof. NAFION-H® resin is a brand name for perfluorinated sulfonic acid resin marketed by the Du Pont company. This material has the chemical structure of Formula I shown on the left hand side of the proposed reaction scheme below (Scheme I):

Formula I

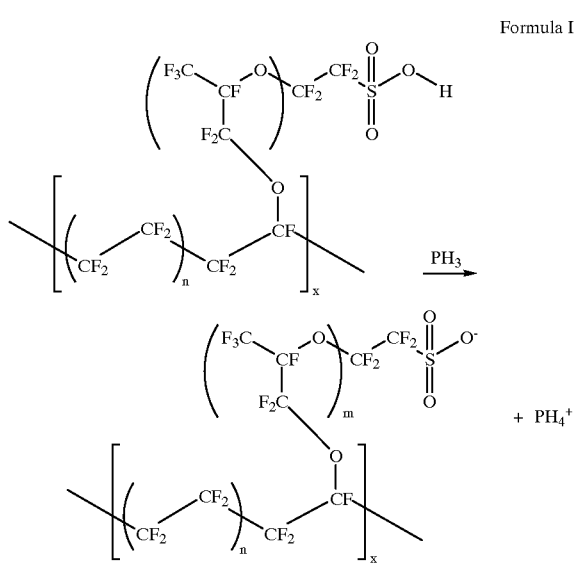

NAFION-H® resin has a Hammett acidity parameter of at least about −12.0, which is equal to or stronger than that of 96 to 100% $H_2SO_4$ (Olah et al., "Perfluorinated Resinsulfonic Acid (NAFION-H®) resin Catalysis in Synthesis," 7 Synthesis 513 (1986)) and is therefore capable of protonating $PH_3$, as shown in Scheme I. The effective acidity of the sulfonic acid groups can be altered in a predictable manner by adding or removing electron-withdrawing groups from the polymeric backbone. Also, the co-polymer fractions (i.e., n, m and x in the formulae) can be varied to affect the physical and chemical properties of the support. Exemplary values for n, m and x are shown in the following table.

|  | n | m | x |
|---|---|---|---|
| Preferred | 0.0 to 4.0 | 0 to 2 | 10 to 10,000 |
| More Preferred | 0.0 to 2.0 | 0 to 1 | 500 to 5,000 |

Thus, the sorptive properties of the sorbent can be tailored to the gas being sorbed and other aspects of the task being performed.

Other fluorinated sulfonic acid polymers, such those represented by Formula II:

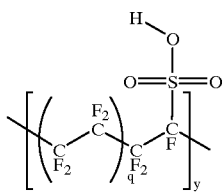

where q is from 0.0 to 9.0, preferably from 0.0 to 1.0, and y is from 10 to 10,000, preferably from 500 to 5,000, can also be suitable for use in the invention. More weakly acidic polymers, while less chemically inert, can also be useful by more weakly binding with the hydride. A common example of a weakly acidic polymer is the cross-linked sulfonated polystyrene-divinylbenzene macroreticular copolymers schematically represented by Formula III:

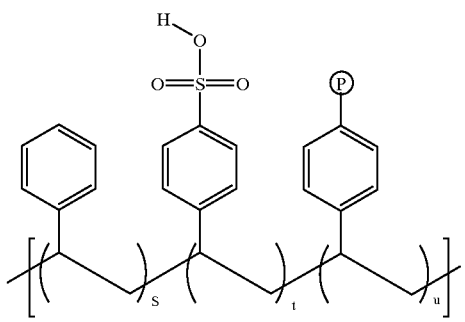

where the circled P denotes a cross-linkage with another polymer, and exemplary values for s, t and u are shown in the following table.

|  | s | t | u |
|---|---|---|---|
| Preferred | 0.0 to 0.75 | 0.25 to 1.0 | 0.0 to 0.25 |
| More Preferred | 0.0 to 0.50 | 0.5 to 0.95 | 0.01 to 0.16 |
| Most Preferred | 0.0 to 0.1 | 0.8 to 0.93 | 0.07 to 0.09 |

A commercially available example of such a polymer is AMBERLYST-15 polymer (available from Rohm & Haas Co.). Typically even less acidic are the carboxylic acid or halogenated carboxylic acid functionalized polymers.

Formula III does not specify a degree of polymerization, because the formula represents cross-linked polymers in which the degree of polymerization is effectively infinite. See, e.g., the definition of "cross-linking" in Whittington's Dictionary of Plastics (Technomic Publishing 1993) and the discussion of cross-linked polymers in The Encyclopedia of Polymer Science and Engineering, Vol. 4, p. 351 (John Wiley & Sons Publishing). Thus, the degree of polymerization is not a meaningful parameter in the context of Formula III, even if a few chains of finite molecular weight are entrapped in the cross-linked matrix in certain embodiments.

While not pertaining to delivery systems for gases, U.S. Pat. No. 5,037,624 to Tom et al. discloses that acidic polymers, including those suitable for use in the present invention, can be used for the removal of strongly basic gases, such as ammonia, from gaseous effluents discharged by semiconductor manufacturing facilities. In embodiments of the present invention, strongly basic gases such as, e.g., $NH_3$ or $MeNH_2$, are used to competitively displace from the sorbent the more weakly bound, weakly basic gas (e.g., AsH₃ or PH₃) initially stored on the sorbent. In such embodiments of the invention, it may not be necessary to heat the sorbent to enhance the delivery rate or pressure, which is advantageous both for the stability of the sorbent and for the inherent simplicity and safety of the system.

From the published dissociation pressure of PH₄I as a function of temperature (Stull, "Vapor Pressure of Pure Substances Organic Compounds," 39 Ind. Eng. Chem. 517–540 (1947), compiled in Brown et al., "Boiling Point Data" in NIST Standard Reference Database Number 69, Eds. Mallard et al., February 1997, National Institute of Standards and Technology, Gaithersburg Md., 20899), it is possible to estimate the energetics of the reaction:

$$PH_3 + HI \rightleftharpoons PH_4I$$

by using the Clausius-Clapeyron Equation. Based on equilibrium pressures of 50 torr at 20° C. and 760 torr at 62.5° C., the enthalpy change of this exothermic reaction is calculated to be ΔH=−104.4 kJ/mol.

Changes in the relative acidities of the solid acid will primarily affect the magnitude of the corresponding ΔH of reaction for a given gas. In contrast, the entropy change (ΔS) of these reactions stems primarily from the loss of translational entropy when the gas is incorporated into the condensed phase and should not depend on the nature of the solid acid. This translational entropy may be calculated by statistical mechanics. The value Of $S_{trans}$ at 25° C. and 1 atm. is calculated as 0.14, 0.15 and 0.16 kJ/mol·K for NH₃, PH₃ and AsH₃ gases, respectively.

Since the equilibrium constant at a given temperature depends solely on the Gibbs free energy, given a fixed entropy change, increasing the acidity of the sorbent and consequently raising the magnitude of the reaction enthalpy will necessarily increase the equilibrium constant. These relationships are given below in Equations 1 and 2.

$$\Delta G = \Delta H - T\Delta S \quad \text{(Equation 1)}$$

$$K = e^{\frac{-\Delta G}{RT}} = \frac{P_{MH_3}}{P_O} \quad \text{(Equation 2)}$$

As it is desirable to maximize the total quantity of gas that can be delivered from a given mass of sorbent within the limits of partial pressures amenable to its use, the optimal value of K should be determined. Assuming a single condensed phase with non-interacting acidic sites, the Langmuir isotherm (Equation 3) may adequately describe the quantity of gas adsorbed as a function of pressure.

$$\Theta = \frac{K}{1+K} \quad \text{(Equation 3)}$$

If the system is maintained at a constant temperature, the maximum change in capacity between two pressures, a and b will thus occur when $$K = \frac{1}{|\sqrt{ab}|} \quad \text{(Equation 4)}$$

Working backwards, this K would require a Gibbs free energy change equal to:

$$\Delta G = \frac{RT}{2} \ln(ab) \quad \text{(Equation 5)}$$

Thus, additional storage capacity within the fixed pressure limits can be obtained by increasing the density of acid sites or by increasing the temperature as the pressure begins to fall.

| Symbols in Equations 1–5: | |
|---|---|
| ΔG - Gibbs free energy change | Θ - fractional loading |
| ΔH - enthalpy change | p - partial pressure |
| ΔS - entropy change | $p_0$ - reference pressure |
| K - equilibrium constant | R - gas constant |
| T - absolute temperature | a - maximum usage pressure |
| b - minimum usage pressure | |

The application of adsorbents to reduce the equilibrium pressure of dangerous gases is currently being practiced. One problem of the devices is the expense of the specialty gas adsorbed on the support which cannot be removed under normal operating conditions. A major expense of these devices comes from the cost of these gas molecules which must be kept in inventory, but are not immediately available for delivery. The current art typically employs a microporous aluminosilicate (zeolite) to physically adsorb the gas. It is difficult to rationally tune the affinity of binding between the specialty gas and the walls of these physical adsorbents. An advantage of the present invention is the ability to tune the absorption properties of the solid acid to maximize the fraction of the specialty gas that is absorbed which can be delivered under the usage conditions. This optimization can take advantage of the nearly continuous variations in acidity which can be obtained by molecular engineering of the monomers and by varying the copolymer ratios used in the preparation of the acidic ionic polymers.

While the invention has been described in detail and with reference to specific examples thereof, it will be apparent to one skilled in the art that various changes and modifications can be made therein without departing from the spirit and scope thereof.

What is claimed is:

1. A method for delivering a gas selected from the group consisting of silane, germane, phosphine, trifluorophosphine, arsine, stibine, hydrogen sulfide, hydrogen selenide and hydrogen telluride, said method comprising:
   providing a support comprising at least one polymer sufficiently acidic to protonate said gas;
   contacting said support with said gas, to protonate said gas by said at least one polymer and form a solid salt sorbed by said support; and
   deprotonating said sorbed solid salt to regenerate said gas, to deliver said regenerated gas,
   wherein said gas has a proton affinity of less than 866 kJ/mol, and said at least one polymer has a first Hammett acidity value more negative than a second Hammett acidity value of a conjugate acid of said gas.

2. The method of claim 1, wherein said proton affinity of said gas is about 607 kJ/mol to about 837 kJ/mol.

3. The method of claim 1, wherein said proton affinity of said gas is from 628 kJ/mol to 795 kJ/mol.

4. The method of claim 1, wherein said gas is phosphine or arsine.

5. The method of claim 1, wherein said first Hammett acidity value is from −17 to 6.5.

6. The method of claim 1, wherein said first Hammett acidity value is from −14 to 2.

7. The method of claim 1, wherein said first Hammett acidity value is from −12.5 to −7.

8. The method of claim 1, wherein said first Hammett acidity value is −12 or more negative than −12.

9. The method of claim 1, wherein said at least one polymer is selected from the group consisting of polymeric sulfonic acids, polymeric perfluoroalkylsulfonic acids, fluorinated sulfonic acid polymers, cross-linked sulfonated polystyrene-divinylbenzene macroreticular copolymers, carboxylic acid polymers, halogenated carboxylic acid functionalized polymers and mixtures thereof.

10. The method of claim 1, wherein said at least one polymer is selected from the group consisting of polymeric sulfonic acids, polymeric perfluoroalkylsulfonic acids, fluorinated sulfonic acid polymers and mixtures thereof.

11. The method of claim 1, wherein said at least one polymer is a fluorinated sulfonic acid represented by the following Formula II:

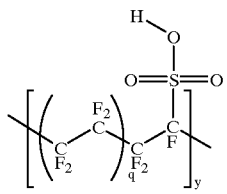

where q is from 0.0 to 9.0 and y is from 10 to 10,000.

12. The method of claim 11, wherein q is from 0.0 to 1.0 and y is from 500 to 5,000.

13. The method of claim 1, wherein said at least one polymer is a cross-linked sulfonated polystyrene-divinylbenzene macroreticular copolymer represented by the following Formula III:

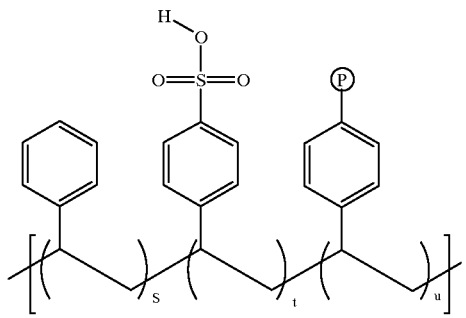

where s is from 0.0 to 0.75, t is from 0.25 to 1.0, and u is from 0.0 to 0.25.

14. The method of claim 13, wherein s is from 0.0 to 0.50, t is from 0.5 to 0.95, and u is from 0.01 to 0.16.

15. The method of claim 14, wherein s is from 0.0 to 0.1, t is from 0.8 to 0.93, and u is from 0.07 to 0.09.

16. The method of claim 1, wherein said solid salt is heated to effect said deprotonating.

17. The method of claim 1, wherein said solid salt is contacted with a competitive base compound to effect said deprotonating, said competitive base compound having a proton affinity greater than that of said gas.

18. The method of claim 17, wherein said competitive base compound has a proton affinity of at least 866 kJ/mol.

19. The method of claim 17, wherein said competitive base compound is ammonia.

20. A method for delivering a gas selected from the group consisting of silane, germane, phosphine, trifluorophosphine, arsine, stibine, hydrogen sulfide, hydrogen selenide and hydrogen telluride, said method comprising:

providing a support comprising at least one polymer sufficiently acidic to protonate said gas;

contacting said support with said gas, to protonate said gas by said at least one polymer and condensed to form a solid salt sorbed by said support; and deprotonating said sorbed solid salt to regenerate said gas, to deliver said regenerated gas, wherein said gas has a proton affinity of less than 866 kJ/mol, and said at least one polymer has a first Hammett acidity value more negative than a second Hammett acidity value of a conjugate acid of said gas and said at least one polymer is a perfluorinated sulfonic acid represented by the following Formula I:

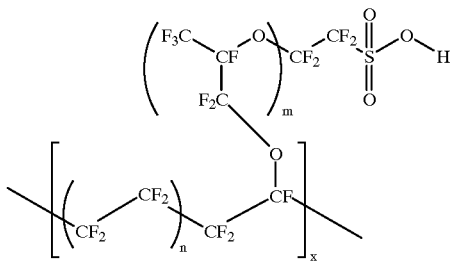

where m is from 0 to 2, n is from 0.0 to 4.0 and x is from 10 to 10,000.

21. The method of claim 20, wherein m is from 0 to 1, n is from 0.0 to 2.0, and x is from 500 to 5,000.

* * * * *